US009486886B2

(12) United States Patent
Foerster et al.

(10) Patent No.: US 9,486,886 B2
(45) Date of Patent: Nov. 8, 2016

(54) DEVICE FOR PIVOTING A ROTOR OF A TURBOMACHINE FROM A FIRST POSITION INTO A SECOND POSITION

(75) Inventors: Carsten Foerster, Essen (DE); Armin Hulfenhaus, Langenfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 423 days.

(21) Appl. No.: 14/343,854

(22) PCT Filed: Sep. 13, 2012

(86) PCT No.: PCT/EP2012/067923
§ 371 (c)(1),
(2), (4) Date: Mar. 9, 2014

(87) PCT Pub. No.: WO2013/037874
PCT Pub. Date: Mar. 21, 2013

(65) Prior Publication Data
US 2014/0208584 A1 Jul. 31, 2014

(30) Foreign Application Priority Data
Sep. 15, 2011 (EP) .................................... 11181387

(51) Int. Cl.
B23Q 1/25 (2006.01)
B23P 19/04 (2006.01)
F01D 25/28 (2006.01)

(52) U.S. Cl.
CPC ............. *B23P 19/04* (2013.01); *F01D 25/285* (2013.01); *F05D 2230/68* (2013.01); *F05D 2230/70* (2013.01); *F05D 2250/411* (2013.01); *Y10T 29/53* (2015.01)

(58) Field of Classification Search
CPC ...... B23P 19/04; F01D 25/285; F01D 25/28; Y10T 29/53; F05D 2250/411; F05D 2230/68; F05D 2230/70; F05D 2240/60; F05D 2240/94; F02C 7/20; F02C 7/06
USPC ..................................................... 60/796–798
See application file for complete search history.

(56) References Cited

U.S. PATENT DOCUMENTS

| 1,923,126 A | 8/1933 | Tucker |
| 5,681,033 A | 10/1997 | Bullen |

(Continued)

FOREIGN PATENT DOCUMENTS

| DE | 2426231 A1 | 12/1975 |
| JP | 51134107 U | 10/1976 |
| JP | 10317912 A | 12/1998 |
| JP | 2010523900 A | 7/2010 |

(Continued)

*Primary Examiner* — Monica Carter
*Assistant Examiner* — Nirvana Deonauth
(74) *Attorney, Agent, or Firm* — Beusse Wolter Sanks & Maire

(57) ABSTRACT

A device for pivoting a rotor of a turbomachine from a first—preferably horizontal—position into a second—preferably vertical—position is provided. The rotor includes a plurality of rotor discs held together by at least one tension rod, the device includes two sidewall elements arranged parallel to one another, a bridge element connecting the sidewall elements to one another, and a divisible turning ring for form-fittingly holding an axial section of the rotor to be positioned perpendicularly. The rotor further includes two pins rotatably seated in the sidewall elements and arranged flush to the turning ring in order to pivot the turning ring about a pivot axis parallel to the horizontal plane. The bridge element includes a disk, wherein the disk is movable perpendicularly to the horizontal plane in order to be bolted in a flange-like manner onto a rotor retained by the device.

7 Claims, 4 Drawing Sheets

(56) References Cited

U.S. PATENT DOCUMENTS

| | | | |
|---|---|---|---|
| 6,279,309 B1 * | 8/2001 | Lawlor | F02K 7/10 60/39.35 |
| 2010/0107385 A1 * | 5/2010 | Floter | F01D 25/28 29/23.51 |
| 2010/0139064 A1 | 6/2010 | Floter et al. | |
| 2011/0188997 A1 | 8/2011 | Ni et al. | |

FOREIGN PATENT DOCUMENTS

| | | |
|---|---|---|
| JP | 2010523901 A | 7/2010 |
| JP | 5518513 | 6/2014 |
| SU | 274124 A1 | 6/1970 |
| WO | 0017492 A1 | 3/2000 |
| WO | 2008125506 A1 | 10/2008 |
| WO | 2008125507 A1 | 10/2008 |

* cited by examiner

DEVICE FOR PIVOTING A ROTOR OF A TURBOMACHINE FROM A FIRST POSITION INTO A SECOND POSITION

CROSS REFERENCE TO RELATED APPLICATIONS

This application is the US National Stage of International Application No. PCT/EP2012/067923 filed Sep. 13, 2012, and claims the benefit thereof. The International Application claims the benefit of European Application No. 11181387.9 filed Sep. 15, 2011. All of the applications are incorporated by reference herein in their entirety.

FIELD OF INVENTION

The invention relates to a device for pivoting a rotor of a turbomachine from a first, for example horizontal, position into a second, for example vertical, position, wherein the rotor comprises a plurality of rotor disks which are braced with one another by at least one tie rod.

BACKGROUND OF INVENTION

A device of this type is known, for example, from WO 2008/125507 A2. The device, referred to therein as a turning block, is set up flush with two further bearing blocks along a straight line. The rotor of a gas turbine can be deposited on the two bearing blocks, and its flange arranged on the compressor-side end can then be connected to the turning block. For this purpose, the turning block has at its tip a joint whose axis of rotation extends parallel to the horizontal plane. At the same time, the joint comprises a rolling-bearing-mounted receptacle for a rotatable turntable. After fastening the flange to the turntable, the turbine-side end can be lifted using a crane. In the meantime, the rotor is pivoted about the axis of rotation of the joint and thus moved from its horizontal position into a vertical position. This is also referred to as the straightening-up of the rotor. The rotor is then secured against tilting over by means of a securing device designed as a scaffold. Here, the rotor is secured against tilting over at a comparatively large height, far above the axis of rotation of the joint.

The construction known from the prior art is of comparatively large size and thus causes relatively high costs both in terms of production and during transport.

Furthermore, a turning device for a gas turbine rotor is known from DE 24 26 231 A1. In the case of the known turning device, a holding ring mounted about a horizontal pivot axis in two lateral supports is provided, which holding ring can engage around a section of the rotor to be set up. However, this turning device is not suitable for relatively large or relatively heavy rotors and does not offer sufficient fastening for special loads which occur.

SUMMARY OF INVENTION

An object of the invention is therefore to provide a device for setting up a rotor of a turbomachine, which device is designed on the one hand to be particularly small and compact. Furthermore, the device should be earthquake-proof and can also be used in open terrain. For this purpose, the device must be suitable to reliably absorb forces acting on the rotor as a result of wind forces and wind loads.

An object on which the invention is based is achieved with a device according to the features of the independent claim.

According to an embodiment of the invention, it is provided that the device comprises two sidewall elements arranged parallel to one another, a bridge element connecting these sidewall elements to one another, a divisible turning ring for form-fittingly receiving an axial section of the rotor to be set up, and two pins arranged flush on the turning ring and rotatably mounted in the sidewall elements in order to pivot the turning ring about a pivot axis parallel to the horizontal plane, wherein, in the bridge element, there is mounted a disk which can be moved perpendicular to the horizontal plane and is intended for flange-like screw connection to a vertically set-up rotor held by the device.

Embodiments of the invention thus depart from the prior art in which the weight force of the rotor and the transverse forces which occur while threatening to tilt over the rotor must be dissipated by two separate constructions. The inventors have recognized that a compact and thus small device for holding and for securing the rotor against tilting over can also be achieved if, on the one hand, the weight force of the rotor is introduced by a turning ring and via its pins to two sidewall elements arranged parallel to one another and the rotor can be secured against tilting over not above this turning ring, but below—i.e. between turning ring and foundation—by a disk which is mounted in the bridge element and can be moved perpendicular to the horizontal plane.

Consequently, after setting up the rotor into a vertical position using the crane, the disk provided in the bridge element is moved from its lower parked position until it bears against the compressor-side end of the rotor. Then, the disk can be screwed to the flange arranged on the compressor-side end of the rotor such that the rotor is then secured against tilting over. Of course, it can be provided that a significant portion of the weight force is dissipated not only via the turning ring and the pins into the sidewall elements and further into the foundation, but also via the movable disk and the bridge element which connects the two sidewall elements to one another. With the aid of the aforementioned device, it is possible that it can be produced and transported, on the one hand, with a small design and thus in a cost-effective manner. Furthermore, it has been found that, as a result of the construction chosen, a dissipation of special loads such as, for example, wind loads or earthquake loads can be reliably ensured.

Further advantageous refinements of embodiments of the invention are specified in the respective subclaims. Unless otherwise stated, the features of different subclaims can be combined with one another in any desired manner.

According to a first advantageous refinement, the disk can be pivoted about the movement direction. This allows a simple orientation of the thread arranged in the disk with respect to those openings which are provided on the compressor-side flange. As a result, the thread of the disk and the openings of the gas turbine rotor flange can be made to overlap one another in a particularly simple manner, so that simple means can be used to screw the disk to the rotor comparatively quickly.

A particularly advantageous refinement is one in which the disk can be raised and lowered hydraulically. As a result, the disk can also be pressed with a predetermined force against the compressor-side flange of the rotor, which produces a load-bearing contact with the rotor.

With further preference, the turning ring has a cover. With the aid of this cover, it is possible for a shaft collar arranged on the axial section of the rotor to be fixed in a form-fitting manner in the turning ring, with the result that the rotor is secured against an axial displacement within the turning ring along both directions. Unintended and suddenly occurring displacement during the straightening-up operation can thus be reliably avoided.

According to a further advantageous development, a lock is in each case articulated on each sidewall element and can be locked on or screwed to the respective other sidewall element. With the aid of the two locks, the sidewall elements which are in any case coupled to one another via the bridge element are again connected to one another, with the result that the device, with the locks closed, is thereby further rigidified overall. The higher rigidity would lead to an increased protection against wind loads and earthquake loads.

The aforementioned refinement can be advantageously developed if a clamping shoe for clamping in the rotor flange is provided on each lock. With the aid of this measure, the rotor is secured against falling over at a further point, which results in the fact that the device itself again secures the rotor against falling over. This measure increases the earthquake protection and wind load resistance further.

In order to specify a particularly simple device which can be fastened in a reliable manner, the two sidewall elements can be fixedly screwed to an earthquake-proof foundation via a metal baseplate.

BRIEF DESCRIPTION OF THE DRAWINGS

Further advantages and features of the invention are explained in more detail by way of embodiments. Here, embodiments of the invention are illustrated in the individual figures, in which.

In all of the figures, identical components are provided with the same reference signs.

DETAILED DESCRIPTION OF INVENTION

Figure 1:
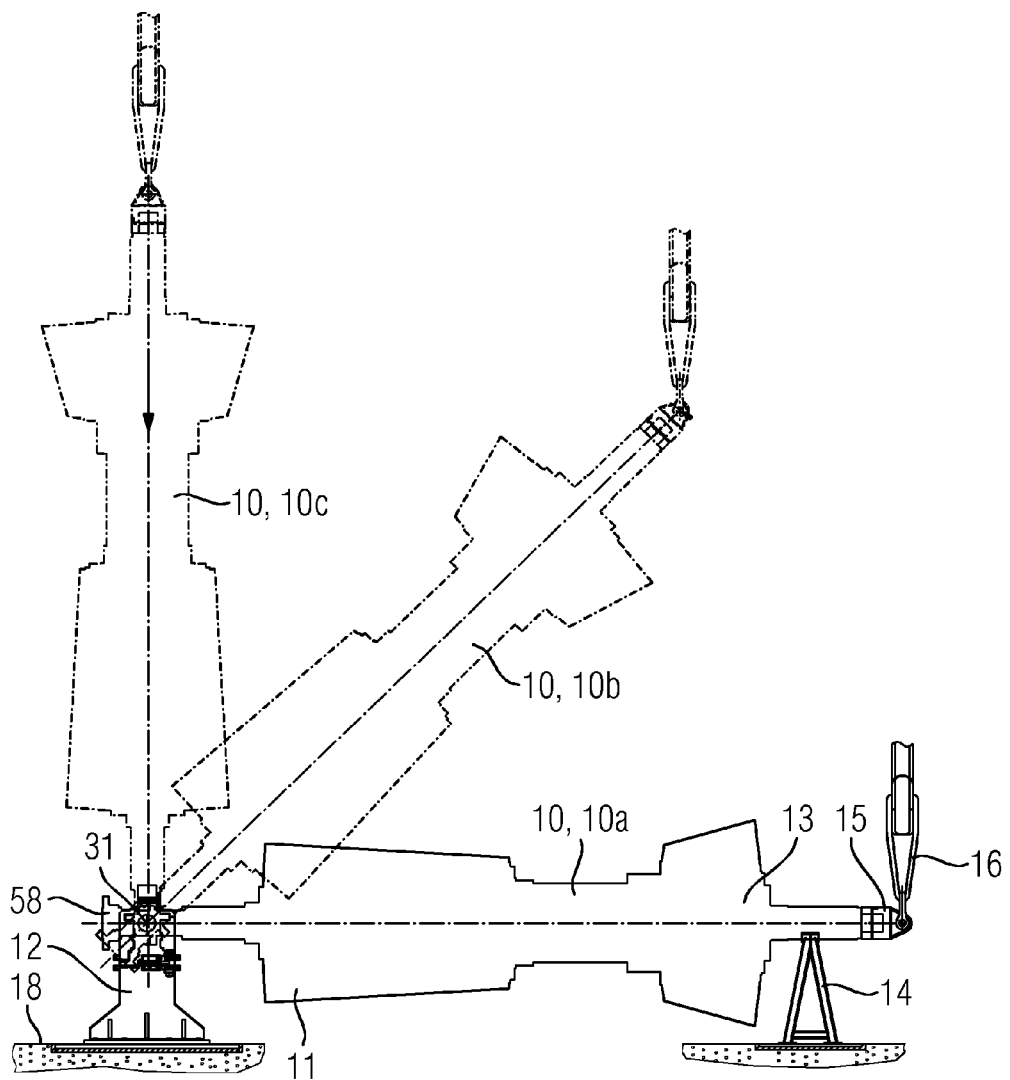
FIG. 1 shows in a schematic illustration the straightening-up of a rotor of a turbomachine from a horizontal position into a vertical position with the aid of a device for straightening up the rotor.

FIG. 1 schematically shows the straightening-up of a rotor 10 of a turbomachine from a horizontal position into a vertical position. Here, the rotor 10 can be designed in any desired manner. However, the rotor 10 is preferably designed as a so-called disk rotor which comprises a plurality of axially adjoining rotor disks which are braced with one another by at least one tie rod, which is not further illustrated in detail. The rotor 10 is illustrated in three different positions. In the first position, the rotor 10 is in the horizontal position 10a. Here, the rotor 10 lies with its compressor-side end 11 on a device 12, which is also referred to as a turning block. The compressor-side end 11 of the rotor 10 is pivotably arranged in the device 12. The turbine-side end 13 of the rotor 10 is deposited on a simply designed roller block 14. A nut 15 is screwed onto the turbine-side end 13 of the rotor 10. A hook 16 of a crane is fastened to the nut 15. Lifting the rotor 10 with the aid of the crane causes the latter to be straightened up from the first position 10a, via an intermediate position 10b, into a second position 10c perpendicular to the horizontal plane. In the meantime, the rotor 10 pivots about a pivot axis 31 parallel to the horizontal plane 18. After the rotor 10 has been straightened up, the latter is secured in the device 12 against tilting over, which is described in more detail in the following figures. The hook 16 can then be removed from the nut 15 screwed onto the tie rod, so that the turbine-side end 13 of the rotor 10 projects upwardly with its free end. In this position 10c, maintenance work can be carried out on the rotor 10. For example, the rotor 10 can be dismantled into its individual components. Of course, the method and the device 12 is also provided for the purpose of straightening up only the tie rod of the rotor 10 from a horizontal position 10a into a vertical position 10c so that it can then be equipped with the rotor disks.

Figure 2:
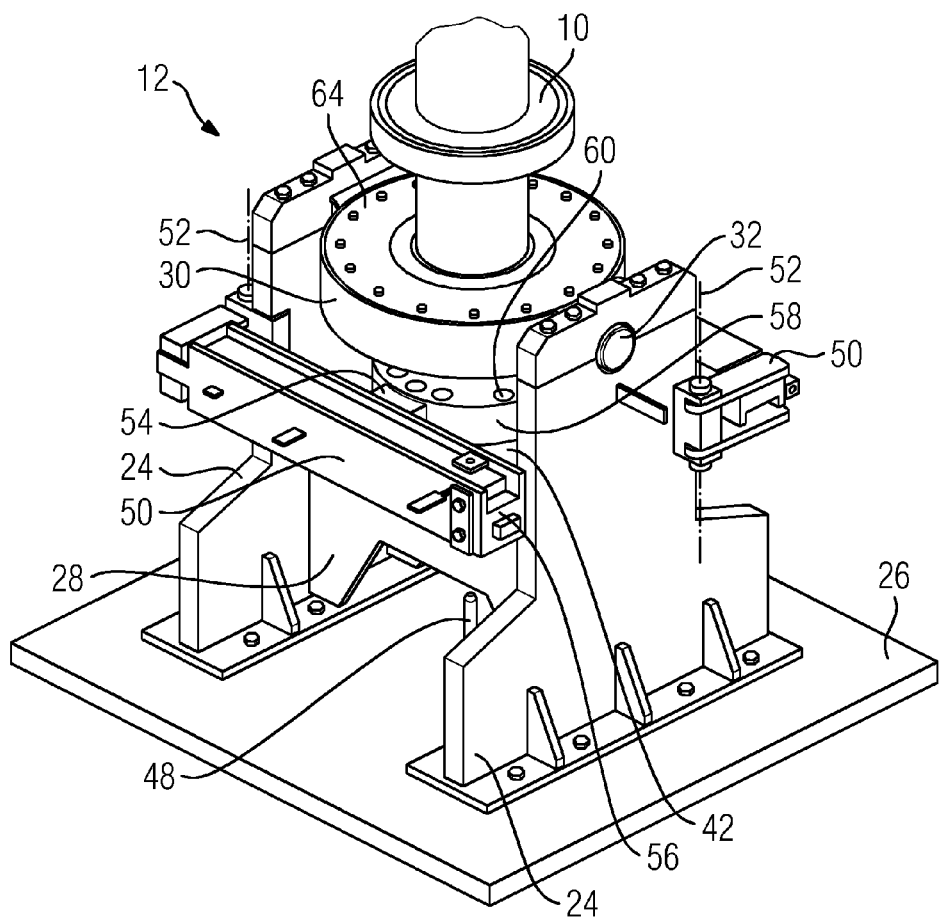
FIG. 2 shows in a perspective view the schematically illustrated device.
Figure 3:
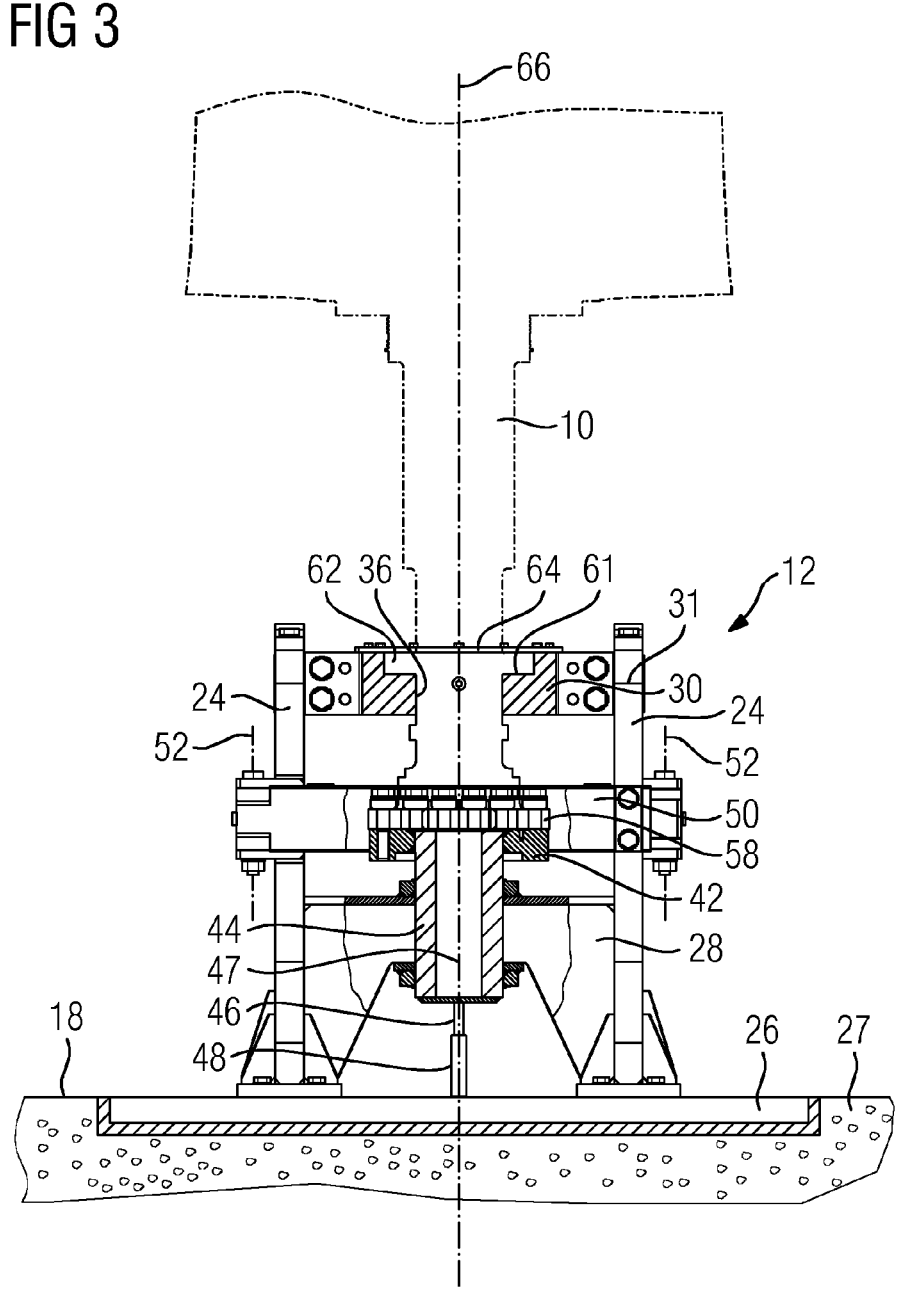
FIG. 3 shows the device illustrated in FIG. 2 in a partially sectioned side view.
Figure 4:
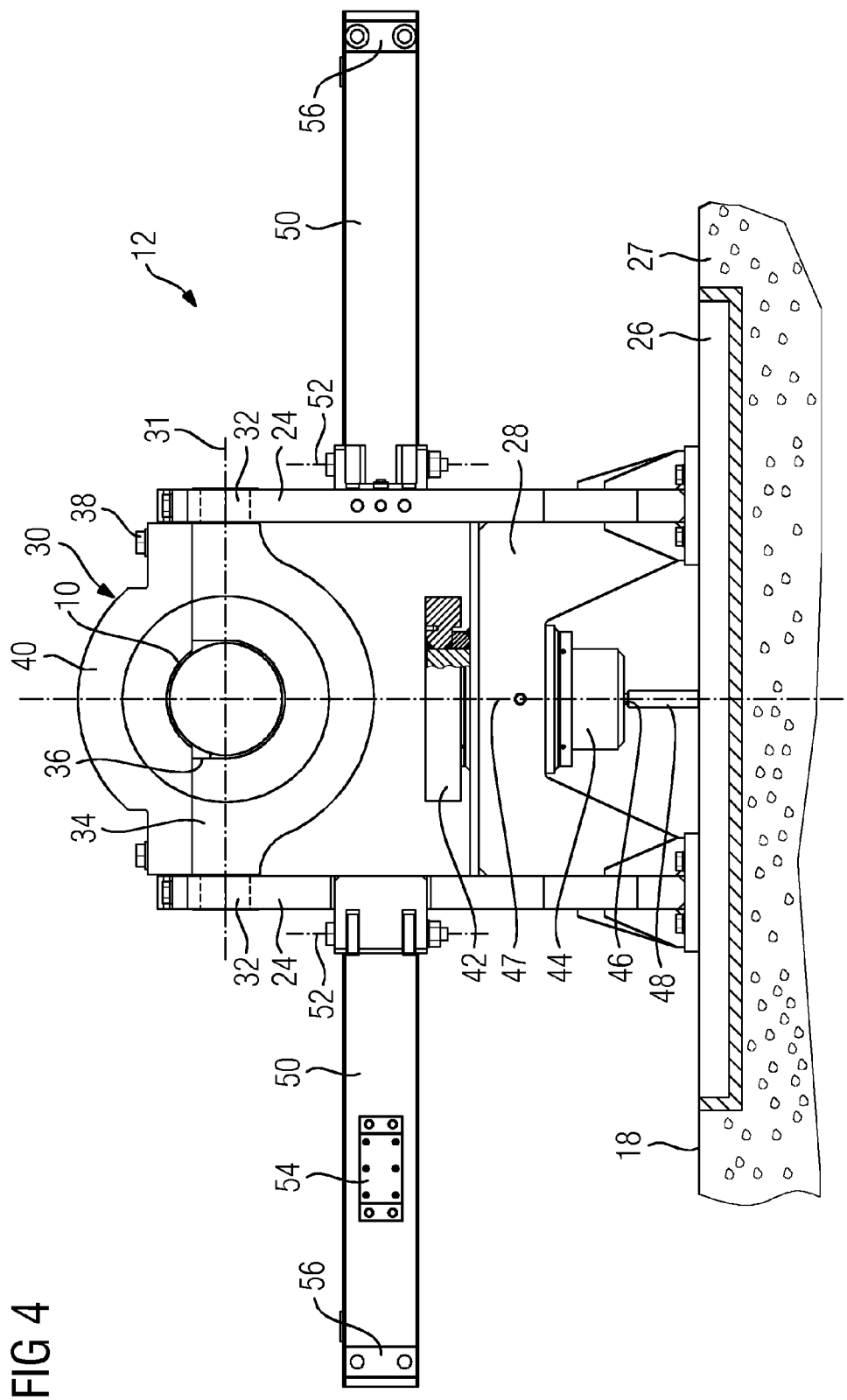
FIG. 4 shows the device in a further side view with the locks swung open.

The individual components of the device 12 are shown in detail in FIGS. 2 to 4. The device 12 comprises two mutually opposite sidewall elements 24 which are arranged parallel to one another and which, in side view, have substantially the contour of an inverted T. The two sidewall elements 24 are fastened securely to a common baseplate 26. The baseplate 26 can be fastened to a foundation 27 (FIG. 3) which can absorb particularly high forces and dissipate them into the ground. The two sidewall elements 24 are fixedly connected to one another via a bridge element 28. The bridge element 28 comprises two parallel T-shaped plates which are welded to the two sidewall elements 24. A turning ring 30 is arranged between the two sidewall elements 24. Two pins 32 are fastened at mutually opposite positions of the turning ring 30 and are rotatably mounted about the pivot axis 31 in each case in one of the two sidewall elements 24. The pivot axis 31 is arranged substantially parallel to the horizontal plane 18. The turning ring 30 is designed such that it can be divided and for this reason comprises a first element 34 (FIG. 4) with an opening 36 which is U-shaped in contour for receiving and inserting the rotor 10 to be pivoted. A yoke 40 which can be screwed onto the first element 34 via screws 38 closes the open side of the opening 36, with the result that the rotor 10 can be securely held in the opening 36.

A disk 42 which can be moved perpendicular to the horizontal plane 18 is arranged on the bridge element 28. For this purpose, a cylindrical pin 44 is inserted (FIG. 3) and welded in the disk 42. The pin 44 can be displaced in a corresponding guide in the bridge element 28 along a vertical 47 extending perpendicular to the horizontal plane 18. A piston rod 46 of a hydraulic cylinder 48 is fastened to the lower end of the pin 44. The hydraulic cylinder 48 is supported on the baseplate 26. In the position of the piston rod 46 illustrated in FIG. 4, the disk 42 is situated in its lower (with respect to the horizontal plane 18) position.

Moreover, an L-shaped lock 50 is articulated on each of the sidewall elements 24. The two locks 50 can in each case be pivoted about an axis 52 perpendicular to the horizontal plane. Moreover, a clamping shoe 54 for clamping in the rotor 10 is provided centrally on the inner sides of the long leg of the locks 50. In FIG. 4, the locks 50 are illustrated in the open position. In a closed position, the otherwise freely projecting ends 56 of the locks 50 are locked on or screwed to the respective other sidewall element 24 (FIGS. 2, 3).

A plurality of internal threads are arranged in the disk 42, with the aid of which internal threads a flange 58 (FIG. 1) arranged on the compressor-side end 11 of the rotor 10 can be screwed to the disk 42.

In order to deposit the rotor 10 in the device 12, the turning ring 30 has to be pivoted into the position shown in FIG. 4. The yoke 40 of the turning ring 30 has then to be removed by loosening the screws 38, with the result that the opening 36 is laterally accessible. Then, with the aid of a crane, the rotor 10 can be deposited into the opening 36 and onto the roller block 14 illustrated in FIG. 1. Here, the rotor 10 is deposited in such a way that the flange 58 arranged on the compressor-side end 11 of the rotor 10 projects—as shown in FIG. 1. The opening 36 is then closed laterally in that the yoke 40 is securely fastened to the first element 34 with the aid of the screws 38. Then, with the aid of the crane—as shown in FIG. 1—the rotor 10 is straightened up from its horizontal position 10a into the vertical position 10c. The locks 50 are then pivoted from their open position into the closed position (FIGS. 2, 3). Consequently, the free ends 56 are fixedly connected to the respective other sidewall element 24. The clamping shoes 54 arranged centrally on the locks 50 then clamp in the flange 58 of the rotor 10 at two mutually opposite points and thus secure the rotor 10 from tilting over.

Then, with the aid of the hydraulic cylinder 48 and the piston rod 46 and also the pin 44, the disk 42 arranged thereon is moved up to the flange 58. Consequently, the disk 42 is rotated about the vertical 47 until its threaded openings are aligned with the openings 60 arranged on the flange 58. The flange 58 can then be screwed with the disk 42 from above (FIG. 3). As can be seen from the turning ring 30 illustrated in cross section in FIG. 3, it—more precisely its opening 36—is provided with a shoulder 61. A shaft collar 62 provided on the rotor 10 can then bear in a form-fitting manner in the opening 36 on the shoulder 61. On the other side, too, the shaft collar 62 is blocked against any displacement by a cover plate 64 screwed onto the turning ring 30. As a result, a movement of the rotor 10 in the opening 36 along the rotor axis 66 is prevented.

The weight force of the rotor 10 is dissipated via the turning ring 30 and its pin 32 into the sidewall elements 24 and further via the baseplate 26 into the foundation 27. An introduction of force which prevents the rotor 10 from falling over occurs—with respect to the horizontal plane 18—below the turning ring 30 with the aid of two securing means. The first securing means comprises the locks 50 articulated on the respective sidewall elements 24 and the clamping shoes 54 arranged on said locks. The other securing element comprises the disk 42 which is screwed onto the flange 58 and can absorb the transverse forces via the pins 44 with the bridge element 28 and the sidewall elements 24. Since the rotor 10 is doubly secured against falling over, the device 12 is suitable for dissipating even particularly large loads into the foundation 27 and into the ground. Here, such large forces can be dissipated as occur even during hurricane storms on rotors 10 set up in the open or else during earthquakes. It is unimportant here whether, when setting up the rotor 10, at first the first securing means comprising the locks 50 or the second securing means comprising the disk 42 is activated.

An embodiment of the invention thus relates overall to a device 12 for pivoting a rotor 10 of a turbomachine from a first—preferably horizontal—position 10a into a second—preferably vertical—position 10c, wherein the rotor 10 comprises a plurality of rotor disks which are braced with one another by at least one tie rod, comprising two sidewall elements 24 arranged parallel to one another, a bridge element 28 connecting these sidewall elements 24 to one another and a divisible turning ring 30 for form-fittingly receiving an axial section of the rotor 10 to be set up and two pins 32 which are arranged flush on the turning ring 30 and are rotatably mounted in the sidewall elements 24 in order to pivot the turning ring 30 about a pivot axis 31 parallel to the horizontal plane. In order to ensure a particularly secure fastening of the vertically set-up rotor 10 which, on the one hand, is earthquake-proof for relatively small earthquakes and, on the other hand, also allows the rotor to be set up in the open and can cope with the possibly occurring hurricane storms there, it is proposed that, in the bridge element 28, there is mounted a disk 42 which can be moved perpendicular to the horizontal plane 18 and is intended for flange-like screw connection to a vertically set-up rotor 10 held by the device 12.

The invention claimed is:

1. A device for pivoting a rotor of a turbomachine from a first position into a second position, wherein the rotor comprises a plurality of rotor disks which are braced with one another by at least one tie rod, comprising:
    two sidewall elements arranged parallel to one another,
    a divisible turning ring for form-fittingly receiving an axial section of the rotor to be set up,
    two pins arranged oppositely on the turning ring and rotatably mounted in the sidewall elements in order to pivot the turning ring about a pivot axis parallel to the horizontal plane, and
    a bridge element connecting the sidewall elements to one another, wherein in the bridge element, there is mounted a disk adapted to be moved perpendicular to the horizontal plane and intended for flange-like screw connection to a vertically set-up rotor held by the device.

2. The device as claimed in claim 1, wherein the disk is adapted to be pivoted about the movement direction.

3. The device as claimed in claim 1, wherein the disk is adapted to be actuated hydraulically.

4. The device as claimed in claim 1, wherein the turning ring has a cover plate.

5. The device as claimed in claim 1, wherein a lock is articulated on each sidewall element and adapted to be locked on the respective other sidewall element.

6. The device as claimed in claim 5, further comprising a clamping shoe for clamping in the rotor on each lock.

7. The device as claimed in claim 1, in which the sidewall elements are fixedly screwed to a foundation directly or indirectly via a metal baseplate.

* * * * *